3,213,103
NEW BIOCIDAL BIS (DIMETHYLAMIDO) PHOS-
PHORYLAMINO-TRIAZOLE-1,2,4 DERIVATIVES
Bernardus Gerhardus van den Bos and Jacques Meltzer,
Weesp, Netherlands, assignors to North American
Philips Company, Inc., New York, N.Y., a corporation
of Delaware
No Drawing. Filed Feb. 5, 1963, Ser. No. 256,246
Claims priority, application Netherlands, Feb. 12, 1962,
274,692
3 Claims. (Cl. 260—308)

Applicants' Belgian patent specification 567,166 states that phosphorus containing amino-triazole derivatives of the general formula

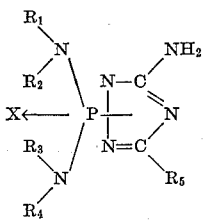

or a tautomeric form thereof, in which formula $R_1$, $R_2$, $R_3$ and $R_4$ represent aliphatic hydrocarbon residues, $R_5$ represents hydrogen, an alkyl-, cycloalkyl-, aryl-, or aralkyl group, in which one or more substituents and/or unsaturated bonds may be present and X represents an oxygen or sulphur atom, are active against noxious organisms, for example moulds, insects and spiders.

Applicants have found now that certain compounds according to the above formula, in which one of the hydrogen atoms of the amino group is substituted by an alkyl- or phenyl group, and in which further $R_1$, $R_2$, $R_3$ and $R_4$ represent methyl groups and $R_5$ a phenyl group or an alkyl group having from 2 to 6 carbon atoms, and X oxygen, have the said activity and, in contrast with the compounds already known have a particularly prolonged residual activity.

The invention relates to a new biocidal bis(dimethylamido) phosphoryl-amino-triazole derivatives of the general formula:

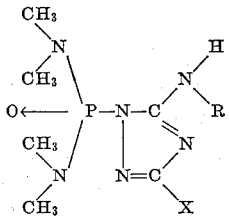

or a tautomeric form thereof, in which formula X designates an alkyl group having from 2–6 carbon atoms or a phenyl group, and R represents an alkyl group having 1 to 4 carbon atoms or a phenyl-, chlorophenyl- or methoxyphenyl group which may contain a methyl group.

In a tautomeric form the hydrogen atom of the

group can be displaced to a ring-nitrogen atom so that the structure of the ring will become as follows:

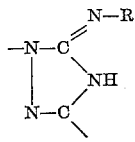

The compounds in which R represents a methyl, ethyl-, phenyl, 4-methoxyphenyl or 4-chlorophenyl group have a very good insecticidal and acaricidal activity. The latter group is particularly active against beetle larvae, for example those of the Colorado beetle.

The residual activity of the compounds according to the invention is surprisingly prolonged. This activity was determined inter alia against the black fly (insecticidal activity) and the red spider (acaricidal activity).

Whereas in the known compound, in which R represents hydrogen, the activity has decreased to approximately 30% of the original value 7 days after administration, and was substantially zero after a fortnight, the insecticidal activity of, for example, the compound in which R represents a phenyl group in the first meant experiment was 97% 35 days after administration and 76% of the original value 43 days after administration; in another experiment the acaricidal activity of this compound 28 days after administration was still 88% and 35 days after administration still 77% of the original value.

Compounds in which R represents an alkyl residue having 1–4 carbon atoms have a satisfactory fungicidal activity and in particular against mildew. The compound in which R represents a methyl- or ethyl group has a particularly strong systemic activity; this holds in particular for the methyl derivative. This was established inter alia in experiments with barley, apple- and cucumber mildew.

On the basis of the above described properties, compounds according to the invention can be used as active constituents of compositions for combating noxious organisms, for example moulds, in particular mildew, insects, in particular aphis fabae, and spiders, in particular the red spider. As a result of the prolonged residual activity, the compounds are useful in particular as active constituents in compositions for combating aphis fabae and the red spider.

The compounds according to the invention may be prepared in various manners. By aminotriazole derivative is to be understood a compound of the formula:

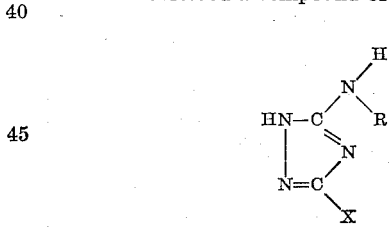

or a tautomer thereof, in which formula R and X have the above meanings. The introduction of the bis(dimethylamido)phosphoryl group in an aminotriazole derivative may be effected, for example, in one operation by reaction of a bis(dimethylamido)phosphorylhalogenide with the derivative in question. The preparation of compounds according to the invention may also be carried out suitably in two reaction stages by causing the amino triazole derivative in question to react with phosphoroxyhalogenide or with an amidophosphoryl-dihalogenide and then converting the resulting product into the final product by reaction with dimethylamine. These reactions are preferably carried out in the presence of a halogen-hydracid binding agent.

A suitable method of carrying out the relative above reactions is further that in which an aminotriazole derivative is used as starting material in which the hydrogen atom of the group >NH in the nucleus is replaced by a metal atom, for example sodium or potassium. The following modes of prepartion are to be considered:

(a) The reaction of an aminotriazole derivative, preferably in the presence of a halogen-hydracid binding agent, with a compound of the formula:

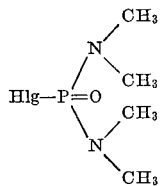

in which formula Hlg represents a hydrogen atom and preferably a chloro atom.

(b) The reaction of an aminotriazole derivative, in which the hydrogen atom of the group >NH in the nucleus is replaced by a metal atom, preferably sodium or potassium, with a compound of the formula:

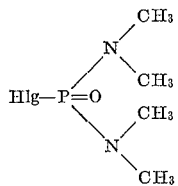

in which formula Hlg has the above meaning.

(c) The reaction of an aminotriazole derivative with phosphoroxy-halogenide, and preferably chloride, succeeded by the conversion of the resulting product with dimethylamine; both reactions preferably in the presence of a halogen-hydracid binding agent.

(d) The reaction of an aminotriazole derivative, in which the hydrogen atom of the group >NH in the nucleus is replaced by a metal atom, preferably sodium or potassium, with phosphoroxyhalogenide, and preferably chloride, succeeded by the conversion of the resulting product with dimethyl amide, preferably in the presence of a halogen-hydracid binding agent.

(e) The reaction of an aminotriazole derivative with a dimethylamido-phosphoryl-dihalogenide, succeeded by the conversion of the resulting product with dimethylamine; both reactions preferably in the presence of a halogen-hydracid binding agent.

(f) The reaction of an aminotriazole derivative, in which the hydrogen atom of the group >NH in the nucleus is replaced by a metal atom, preferably sodium or potassium, with a dimethylamidophosphoryl-dihalogenide, succeeded by the conversion of the resulting product with dimethylamine, preferably in the presence of a halogen-hydracid binding agent.

Other methods which are to be considered for the preparation of the compounds according to the invention are:

(g) The reaction of phosphorus trihalide and preferably trichloride with an aminotriazole derivative, preferably in the presence of a halogen-hydracid binding agent, or with an aminotriazole derivative in which the hydrogen atom of the group >NH in the nucleus is replaced by a metal atom preferably sodium or potassium, succeeded by the conversion of the resulting product with dimethylamine and oxidation, for example with hydrogen peroxide, of the bis(dimethylamido)phosphorous acid derivative formed.

(h) The reaction of a dimethylamidophosphorous acid dihalogenide and preferably dichloride with an aminotriazole derivative, preferably in the presence of a halogen-hydracid binding agent, or with an aminotriazole derivative in which the hydrogen atom of the group >NH in the nucleus is replaced by a metal atom, preferably sodium or potassium, succeeded by the conversion of the resulting product with dimethylamide and oxidation, for example with hydrogen peroxide, of the bis(dimethylamido)phosphorous acid derivative formed.

(i) The reaction of bis(dimethylamido)phosphorous acid halogenide and preferably chloride, with an amino- triazole derivative, preferably in the presence of a halogen-hydracid binding agent, or with an aminotriazole derivative in which the hydrogen atom of the group >NH in the nucleus is replaced by a metal atom, preferably sodium or potassium, succeeded by oxidation of the resulting product, for example with hydrogen peroxide.

In particular the methods mentioned sub (a) to (f) may be of importance for the practical preparation of compounds according to the invention.

The above reactions are preferably carried out in the presence of a solvent for the aminotriazole derivative. In accordance with the nature of this compound and its substituents, a non-polar or more or less polar solvent will be chosen. As such may be used, for example, aliphatic and aromatic hydrocarbons, for example petroleum ether and benzene, aliphatic ethers, tertiary amines, for example pyridine, nitriles, for example acetonitrile, ketones, for example acetone and methylethylketone, esters, for example ethylacetate, alcohols, for example methanol and ethanol, and in addition for example nitrobenzene, carbon tetrachloride and dimethylformamide.

For the metal compounds, for example those of sodium and potassium, polar solvents, for example acetonitrile, are to be preferred.

As halogen-hydracid binding agents are preferably used tertiary amines, for example trialkylamines, for example trimethyl and triethyl amine, and N,N-dialkylanilines and in addition pyridine and in particular homologues thereof, the picolines, lutidines and collidine and mixtures of these.

Another group of acid binding agents, which may particularly be used with advantage when performing a method according to the invention stated sub (a)), comprises metal and ammonium compounds, for example the oxides, hydroxides, carbonates, bicarbonates, alcoholates and carbonic acid salts. In particular suitable are those of magnesium, calcium, barium and zinc, and particular those of sodium and potassium. A very suitable method is that in which an alkali metal alcoholate is used.

As is known, the phosphoryl halogenides, phosphorus halogenides and phosphorous acid halogenides for example acid halogenides are sensitive to the action of water and metal hydroxide solutions. Therefore, in general the method according to the invention will be carried out in an anhydrous medium.

The method stated sub (a) may also give very good results if as acid binding agent aqueous alkaline hydroxide or alkaline earth hydroxides or carbonates or bicarbonates of these metals are used. Particularly good yields of compounds according to the invention may be obtained, for example, if an amino-triazole derivative is dissolved in a mixture of a lower alcohol, for example methanol or ethanol, and the quantity of a 30–50% by weight alkali hydroxide solution in water theoretically required for binding the releasing hydrohalogenic acid and the bis(dimethylamido) phosphorylhalogenide is added to the resulting solution.

In the method (a) good results may also be obtained if the method is carried out with a dispersion of an aminotriazole derivative in a concentrated aqueous solution or suspension of an alkali hydroxide or alkaline earth hydroxide.

The reactions in which a tertiary amine is used as the halogen-hydracid binding agent are carried out, for example, at a temperature between 0 and 100° C. and preferably between 40 and 80° C. When using metal or ammonium compounds as the acid binding agents, the reaction may also be carried out at the normal temperature, for example between 15 and 30° C. In those cases, the reaction temperature is preferably chosen somewhat lower, for example between −10 and +10° C.; this holds in particular if the reactions are carried out in an aqueous medium, in particular in a homogeneous medium.

It has appeared that the halogen hydracid binding agent used, whether this is a metal or ammonium compound or a tertiary amine, has no influence on the nature of the resulting products.

It is pointed out that the aminotriazole derivatives used in the method according to the invention which, in addition to the group >NH present therein still contain two nitrogen atoms, may occur in tautomeric forms. This means that the hydrogen atom bound to a cyclic nitrogen atom has no fixed position. In agreement with conceptions expressed about this in literature, this means that the hydrogen atom and the nitrogen atom are interchangeable (see for example J. Org. Chem. XVIII, page 196, 1953). It therefore was to be expected that in the method according to the invention in these cases more isomeric products would be formed beside each other. It has appeared, however, that in all the cases substantially one final product is obtained.

The reactions stated sub (a)–(i) for the preparation of compounds according to the invention may be considered as embodiments of a more general method which is characterised in that an aminotriazole derivative of the formula:

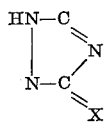

or a tautomer thereof, in which formula R and X have the above meanings, is caused to react, preferably in the presence of a halogen-hydroacid binding agent, or an aminotriazole derivative in which the hydrogen atom of the group >NH in the nucleus is replaced by a metal atom, preferably sodium or potassium, with a compound of the general formula:

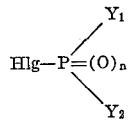

in which formula Hlg represents a halogen atom, preferably a chlorine atom, $Y_1$ and $Y_2$ represent both halogen, preferably chlorine, or each $N(CH_3)_3$ or $Y_1$ this group and $Y_2$ halogen and preferably chlorine, and, if $n=1$ and $Y_1$ and $Y_2$ represent halogen atoms, the resulting product is converted with dimethyl amine, or, if $n=1$, $Y_1$ represents the group $N(CH_3)_2$ and $Y_2$ represents halogen, the resulting product is converted with dimethyl amine, or, if $n=0$ and $Y_1$ and $Y_2$ represent halogen atoms, the resulting product is converted with dimethyl amine, succeeded by oxidation, or, if $n=0$, $Y_1$ represents the group $N(CH_3)_2$ and $Y_2$ represents halogen, the resulting product is converted with dimethylamine succeeded by oxidation, or, if $n=0$ and $Y_1$ and $Y_2$ both represent $N(CH_3)_2$, the resulting product is oxidized.

In order that the invention may readily be carried into effect, the preparation of compounds according to the invention will now be described more fully, by way of example, with reference to the ensuing examples.

*Example 1*

4.1 gms. of sodium were added to 75 cms.³ of methanol, 31 gms. of 3-methyl-amino-5-phenyltriazole-1,2,4 were added to the resulting solution. The methanol was removed from the solution thus obtained by evaporation. The residue was suspended in 200 cms.³ of anhydrous acetonitrile. 32 cms.³ of bis(dimethylamido)phosphoryl chloride were added to the suspension, after which the mixture was boiled for approximately 60 minutes. The acetonitrile was evaporated; the residue was taken up in water and extracted with ether. The ethereal solution was washed with 2 N sodium hydroxide solution and then with water. After drying on sodium sulphate the ether was evaporated. The remaining solid substance (44 gms.) was crystallized from a mixture of 3 parts alcohol and 1 part of water. Yield 40 gms. (=73% of the theoretical) of white crystalline N-bis(dimethylamido)phosphoryl-3-methylamino-5-phenyl triazole-1,2,4. Melting point 135° C.

*Example 2*

Analogous to the method described in Example 1. 32 gms. (=78% of the theoretical) or white crystalline N-bis(dimethylamido)phosphoryl - 3 - (4' - chlorophenyl) amino-5-phenyltriazole-1,2,4 were obtained from 27 gms. of 3-(4'-chlorophenyl)amino-5-phenyl triazole-1,2,4 and 18 cms.³ of bis(dimethylamido)phosphoryl chloride. Melting point 135° C.

*Example 3*

To a mixture of 28 gms. of 3-phenylamino-5-phenyltriazole-1,2,4, 20 gms. of collidine and 200 cms.³ of acetonitrile, 28 gms. of bis(N,N-dimethylamino)phosphorylchloride were added dropwise at 20° C. while stirring. The resulting mixture was stored at 20° C. for a few hours while stirring. Then the acetonitrile was distilled off in vacuo. The residue was extracted with ether. After evaporation of the ether 40 gms. (=93% of the theoretical) of N-bis(dimethylamido)phosphoryl-3-phenylamino-5-phenyl-triazole-1,2,4 remained as an oil.

*Example 4*

35 gms. of 3-methylamino-5-phenyltriazole-1,2,4 were added to a solution of 11 gms. of sodium hydroxide in 15 cms.³ of water and 120 cms.³ of acetone, with stirring. Then 40 cms.³ of bis(dimethylamido)phosphoryl chloride were added to the resulting solution at 30–35° C., also with stirring. After stirring for 45 minutes at 30–35° C., the mixture was poured into 480 cms.³ of 1 N sodium hydroxide solution. The resulting precipitate of N-bis (dimethylamido)phosphoryl - 3 - methylamino-5-phenyltriazole-1,2,4 was sucked off, washed with water and dried. Yield 42.5 gms. (70% calculated on triazole derivative).

In a manner analogous to that of Example 1 were prepared inter alia N - bis(dimethylamido)phosphoryl - 3-n-butylamino-5-phenyltriazole-1,2,4, N-bis(dimethylamido) phosphoryl-3-(4'-methoxyphenyl)amino-5-phenyltriazole-1,2,4, N-bis(dimethylamido)phosphoryl - 3-(2-methyl-4-chlorophenyl)amino-5-phenyltriazole-1,2,4, N-bis(dimethylamido)phosphoryl-3-phenylamino - 5-isopropyltriazole-1,2,4, N-bis(dimethylamido)-phosphoryl-3-phenylamino-5-amyltriazole-1,2,4, N-bis(dimethylamido)phosphoryl-3-ethylamino-5-amyltriazole-1,2,4 and N-bis(dimethylamido)-phosphoryl-3-n-butylamino-5-amyltriazole-1,2,4.

A compound according to the invention may be processed in known manner to a composition for combating noxious organisms.

For this purpose, such a compound may be mixed with solid or liquid carrier materials or may be dissolved therein, and, if desired enriched with dispersing, emulsifying and/or wetting agents. In this manner may be prepared, for example miscible oils, wettable powders and dusts.

For the preparation of miscible oils, the active compound is taken up in a little water-soluble solvent and an emulsifier is added to the solution. Suitable solvents are, for example, xylene, toluene, dioxane, petroleum distillates, which are rich in aromatic compounds, for example solvent naphtha, distilled tar oil, in addition tetralin, cyclohexane or mixtures of these liquids. As emulsifiers may be used inter alia alkylphenoxyglycol ethers, polyoxyethylene sorbitan esters of fatty acids or polyoxyethylene sorbitol esters of fatty acids.

The concentration of the active compound in the poorly water-soluble liquid is not restricted to narrow limits. This may vary, for example, from 2 to 50% by weight. Before use the miscible oils are emulsified in water. As a rule, the concentration of the active compound in these aqueous emulsions lies between 0.01 and 0.5% by weight.

Wettable powders may be prepared by mixing and grinding the active compound with a solid inert carrier material, as a rule in the presence of a dispersing agent and/or a wetting agent. Before use, the wettable powders are dispersed in a liquid, preferably in water.

As a carrier material are to be considered pipe clay, diatomaceous earth, kaolin, dolomite, talc, gypsum, chalk, bentonite, attapulgite, kieselguhr, celite, sawdust, tobacco dust or ground coconut shells. Suitable dispersion agents are lignin sulphonates and naphthalene sulphonates. As wetting agents may be used fatty alcohol sulphonates, alkylaryl sulphonates or fatty acid condensation products.

In the wettable powders also the concentration of the active compounds is not restricted to narrow limits. In general, the concentration will be chosen between 10 and 80% by weight.

Dusts may be prepared by bringing an active compound, as such or dissolved in a solvent, on a solid carrier material. In use the preparation thus obtained is atomized in the air in a dry and finely pulverized condition. These powders may also be prepared in the manner as described for the preparation of wettable powders when choosing suitable light carrier materials. As carrier materials are to be considered substances which are stated above in the description of the preparation of wettable powders. As a rule, the concentration of active compounds in the dusts is lower than that in wettable powders or miscible oils, but higher than the concentration of the active compounds in dispersions or emulsions obtained by diluting wettable powders or miscible oils with liquids. The dusts often contains from 1–20% by weight of the active substance.

What is claimed is:
1. A compound of the formula

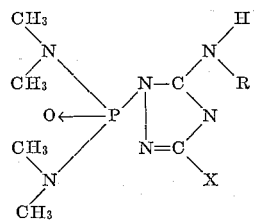

wherein X is a member selected from the group consisting of alkyl of 2 to 6 carbon atoms and phenyl and R is a member selected from the group consisting of alkyl of 1 to 4 carbon atoms, phenyl chlorophenyl and methoxyphenyl.

2. N - bis(dimethylamido) phosphoryl-3-methylamino-5-phenyl triazole-1,2,4.

3. N - bis(N,N-dimethylamido) phosphoryl-3-phenylamino-5-isopropyl-triazole-1,2,4.

References Cited by the Examiner

UNITED STATES PATENTS

| | | | |
|---|---|---|---|
| 1,825,549 | 9/31 | Scheuing et al. | 260—308 |
| 2,476,549 | 7/49 | Heimbach et al. | 260—308 |
| 2,953,491 | 9/60 | Hardy et al. | 167—33 |
| 2,959,519 | 11/60 | Speziale et al. | 167—33 |
| 3,111,526 | 11/63 | Koopmans et al. | 260—308 |

OTHER REFERENCES

Elderfield: Heterocyclic Compounds, volume 7 (New York, 1961), pages 458–461.

Frear: Chemistry of the Pesticides (New York, 1955), pages 101–102.

Taylor et al.: Sidgwick's Organic Chemistry of Nitrogen (Oxford, 1937), pages 20–21.

NICHOLAS S. RIZZO, *Primary Examiner*.

WALTER A. MODANCE, *Examiner*.